United States Patent
Carver et al.

(10) Patent No.: US 7,437,035 B2
(45) Date of Patent: Oct. 14, 2008

(54) SYSTEMS AND METHODS FOR SUPPLYING A DISTRIBUTED LIGHT SOURCE

(75) Inventors: Gary E. Carver, Flemington, NJ (US); Alka Swanson, North Wales, PA (US); Dmitri Garbuzov, Princeton, NJ (US); Timothy R. Koch, Flemington, NJ (US)

(73) Assignee: Princetown Lightwave Inc., Cranbury, NJ (US)

( * ) Notice: Subject to any disclaimer, the term of this patent is extended or adjusted under 35 U.S.C. 154(b) by 161 days.

(21) Appl. No.: 11/285,886

(22) Filed: Nov. 23, 2005

(65) Prior Publication Data

US 2007/0053634 A1   Mar. 8, 2007

Related U.S. Application Data

(60) Provisional application No. 60/688,488, filed on Jun. 7, 2005.

(51) Int. Cl.
G02B 6/34 (2006.01)
(52) U.S. Cl. ......................................................... 385/37
(58) Field of Classification Search .................... 385/37
See application file for complete search history.

(56) References Cited

U.S. PATENT DOCUMENTS

| | | | | |
|---|---|---|---|---|
| 4,468,091 A | * | 8/1984 | Schmadel et al. | 385/5 |
| 5,144,690 A | * | 9/1992 | Domash | 385/12 |
| 5,633,748 A | | 5/1997 | Perez et al. | 359/325 |
| 5,982,962 A | | 11/1999 | Koops et al. | 385/37 |
| 6,021,240 A | * | 2/2000 | Murphy et al. | 385/37 |
| 6,498,877 B1 | * | 12/2002 | Chowdhury et al. | 385/37 |
| 2002/0181914 A1 | * | 12/2002 | Jansen | 385/130 |
| 2005/0163427 A1 | | 7/2005 | Ohta et al. | 385/37 |

OTHER PUBLICATIONS

International Search Report No. PCT/US2006/045404, date of mailing Apr. 3, 2007.

* cited by examiner

*Primary Examiner*—Frank G Font
*Assistant Examiner*—Mary A El Shammaa
(74) *Attorney, Agent, or Firm*—Mintz, Levin, Cohn, Ferris, Glovsky, Popeo PC

(57) ABSTRACT

Embodiments of the present invention are directed methods, apparatuses and system for establishing a linear radiant electromagnet energy field. In one embodiment of the invention, a system for providing a linear field of electromagnetic energy includes a laser, at least one length of single mode or multimode optical fiber including a core having a stitched diffraction grating of predetermined pitch for diffracting electromagnetic energy in a predetermined direction, a longitudinal optical element having a convex surface and a length corresponding to the length of optical fiber, wherein the optical element is sized such that the convex surface is positioned at a predetermined distance from the optical fiber and in a direction to receive electromagnetic energy diffracted by the grating of the optical fiber thereby establishing a linear lighting field and a lenticular array.

30 Claims, 15 Drawing Sheets

Insert light 306

Z = propagation axis
X = rectangle length axis
Y = rectangle height axis

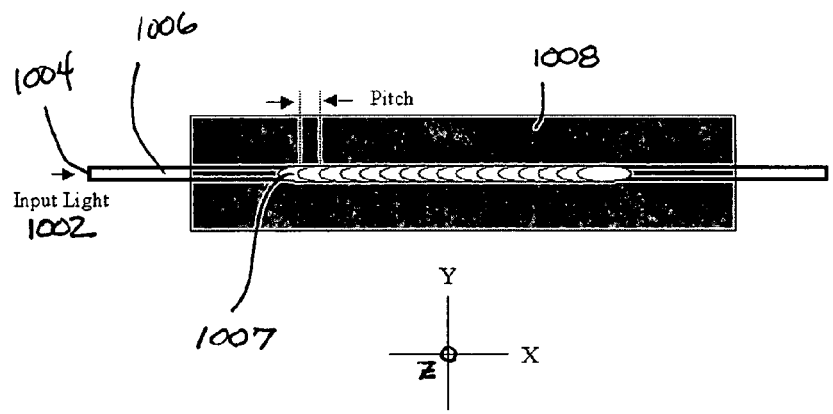
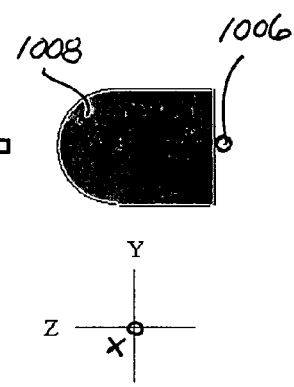
Fig. 10A
Fig. 10B
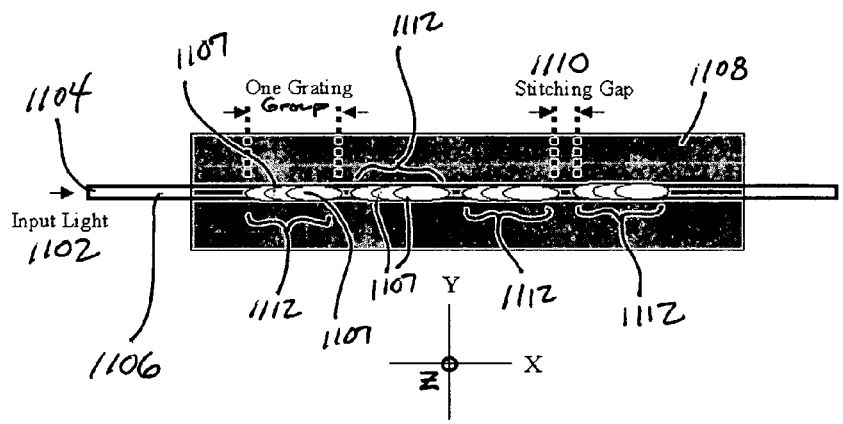
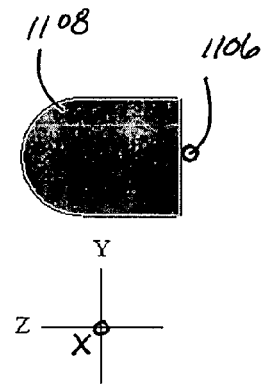
Fig. 11A
Fig. 11B

Light Source Options: double clad pumped ASE

Polarization Issues

SYSTEMS AND METHODS FOR SUPPLYING A DISTRIBUTED LIGHT SOURCE

CLAIM TO PRIORITY

The present application claims priority to 35 U.S.C. §119 (e) of U.S. provisional patent application No. 60/688,488, filed Jun. 7, 2005, the entire disclosure of which is incorporated herein by reference.

FIELD OF THE INVENTION

The present invention is directed to the emission of radiant electromagnetic energy from optical wave guides, and more particularly to lighting arrangements for distributing a predetermined power density over a rectangular region.

BACKGROUND OF THE INVENTION

Lighting arrangements that distribute power density over a long rectangular region are used for high speed sorting and testing of various products, including foodstuffs, vegetables, paper, pharmaceauticals, plastics, recyclables, and the like. These systems illuminate a moving sheet of product so that the product may be inspected with cameras or spectroscopic instruments (see, for example: http://www.satake-usa.com, http://www.bestnv.com/, and http://www.buhlergroup.com/17217EN.asp, http://www.magsep.com/).

In order to create adequate lighting for such inspection devices, the spatial distribution of optical power preferably satisfies several requirements with respect to power density, angular distribution of optical power and wavelength dependence and efficiency. Power density (e.g., mw per cm2) is preferably uniform within a few percent inside the entire light field (i.e., the rectangular region), which often measures (for example) 5 mm by 1 meter and may also fall to low levels outside the rectangle. The angular distribution of optical power preferably allows the power density requirements to be met with working distances (e.g., several cm up to and greater than a meter) compatible with typical sorting machines. With regard to wavelength dependence and efficiency, these parameters preferably are compatible with practical light generation devices.

Prior solutions of providing lighting for high speed sorting equipments include the concepts illustrated in FIGS. 1A-1F. For the sake of clarity, optical lensing elements that shape the beam in one or two axes have been deleted. Moreover, each figure includes reference numeral 100 which represents the illuminated area and rays of light are depicted as arrows in each of the figures.

For example, in FIG. 1A, an illuminated area 100 is provided by a system which includes tube lamps and infrared filaments 102. While the sources for such a system are low cost, they suffer from low intensity, poor directionality, poor efficiency and thermal problems. FIG. 1B illustrates an array of bright LEDs 104 used to create a line source. However, since such a large number of sources are required to create a uniform power density, the cost and complication of the resulting system is typically prohibitive.

FIGS. 1C and 1D illustrate systems which both utilize a single light source. The system illustrated in FIG. 1C uses a bulk arrangement with multiple lenses 108 and light beam splitters 110, which uses a single light source 106, while the system in FIG. 1D accomplishes the function with an optical fiber bundle 114 which is coupled to light source 112 (see U.S. Pat. No. 4,730,895).

FIG. 1E illustrates the use of a grooved light guide for creating a continuous, uniform line source supplied by one light generating device. Specifically, light from light source 116 is transmitted down a lightguide 118 that includes a surface relief 120 on one sidewall. Light scatters from the surface relief and is directed out of the guide toward the illuminated target. This approach has been addressed in the following ways:

holographic scatter centers written on the back sidewall (U.S. Pat. No. 5,721,795);
 prismatic scatter centers placed on a lens in the emission surface (U.S. Pat. No. 5,671,306);
 facets placed on the back sidewall (U.S. Pat. No. 5,894,539); and
 facets placed on a 2D surface for LCD illumination (U.S. Pat. No. 6,036,327).

While these scatter based methods can create uniform illumination, each system is generally inefficient and the resulting light field lacks directionality.

FIG. 1F illustrates a system which includes a collimated laser beam from light source 122 is rapidly raster scanned using a rotatable mirror element 124 over a target to create uniform time-averaged illumination. This approach is costly and exposes operators to free space laser power (U.S. Pat. No. 6,864,970).

Another way to create a line source is to make a side-emitting fiber. Such fibers emit light in all directions by either using "leaky" modes or by placing randomly positioned scatter centers in the core (see Optics and Photoncs News, vol 16, No 10, 2005 and U.S. Pat. No. 6,546,174 and U.S. Pat. No. 6,347,172, all of the foregoing herein incorporated by reference in their entirety). These side-emitters are used for architectural lighting, and are commercially available (see, for example, http://www.svision.com/sign.html# and http://www.laselite.com/).

Accordingly, it is recognized that it would be advantageous to develop a lighting arrangement which solves the above noted drawbacks, preferably distributes significant power density over a shaped field/region, and which is cost effective.

SUMMARY OF THE INVENTION

Embodiments of the present invention include systems and methods for providing a linear light source, for distributing a power density over a rectangular region. In particular, some embodiments of the present invention include one or more optical fiber Bragg (blazed) gratings and a collimating optic to create an efficient, uniform line source. In one particular embodiment, a blazed diffraction grating is provided in the core of an optical fiber. Incident light in the core is diffracted from the core at about 90 degrees (preferably) to the optical fiber axis, which them may be used to establish a shaped (e.g., rectangular) field, using, for example, a convex optical surface.

In another embodiment of the present invention, a linear field radiant electromagnet energy transmitting apparatus is provided and may include at least one length of optical fiber including a core having a diffraction grating for diffracting electromagnetic energy in a predetermined direction and a convex surface having a length corresponding to the length of optical fiber and positioned at a predetermined distance from the optical fiber in a direction to receive electromagnetic energy diffracted by the grating of the optical fiber thereby establishing a linear lighting field.

In another embodiment of the present invention, a method for providing a linear field radiant electromagnet energy transmitting apparatus is provided and may include providing at least one length of optical fiber including a core having a diffraction grating for diffracting electromagnetic energy in a predetermined direction, a convex surface having a length corresponding to the length of optical fiber and positioned at a predetermined distance from the optical fiber in a direction to receive electromagnetic energy diffracted by the grating of the optical fiber thereby establishing a linear lighting field, and an electromagnetic energy source. The method may also include coupling the electromagnetic energy source to one end of the optical fiber, and providing (i.e., pumping) a predetermined wavelength of electromagnetic energy into the optical fiber. The electromagnetic energy is diffracted by the gratings of the core at a predetermined angle from the axis of the optical fiber.

In yet another embodiment of the invention, a system for providing a linear field of electromagnetic energy includes a laser, at least one length of single mode or multimode optical fiber including a core having a stitched diffraction grating of predetermined pitch for diffracting electromagnetic energy in a predetermined direction, a longitudinal optical element having a convex surface and a length corresponding to the length of optical fiber, wherein the optical element is sized such that the convex surface is positioned at a predetermined distance from the optical fiber and in a direction to receive electromagnetic energy diffracted by the grating of the optical fiber thereby establishing a linear lighting field and a lenticular array.

These and other embodiments, advantages and objects of the invention will become even more clear in the detailed description of the embodiments and reference to the attached figures, a brief description of which is provided below.

BRIEF DESCRIPTION OF THE FIGURES

FIG. 10A is a side view of a linear light field system according to an embodiment of the present invention.

FIG. 10B is an end view of a linear light field system according to an embodiment of the present invention.

FIG. 11A is a side view of a linear light field system according to an embodiment of the present invention.

FIG. 11B is an end view of a linear light field system according to an embodiment of the present invention.

DETAILED DESCRIPTION OF THE EMBODIMENTS

Some embodiments of the invention may be designed for use with near infrared light from a single source, while other embodiments may be designed for operation at wavelengths spanning portions of the visible and near infrared.

Figure 1A:
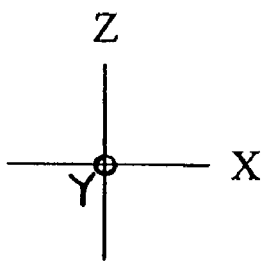
FIGS. 1A-1F illustrate simplified schematic diagrams of various devices for providing a linear light source according to prior art methods.
Figure 1A:
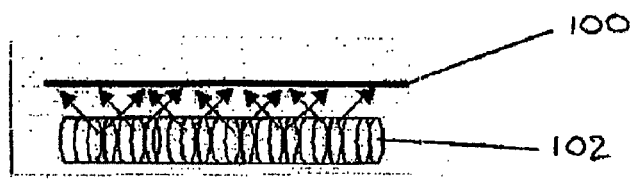
Figure 1B:
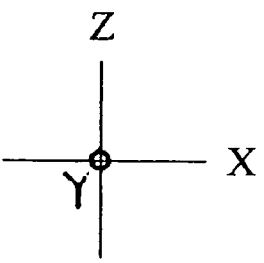
Figure 1B:
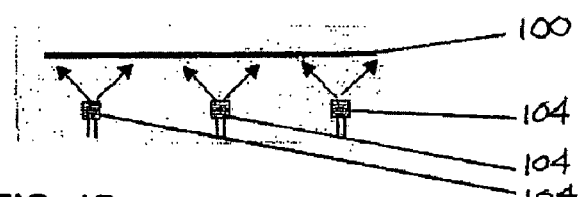
Figure 1C:
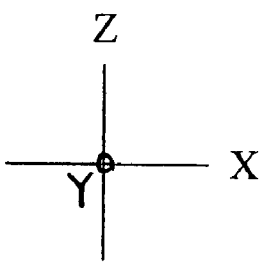
Figure 1C:
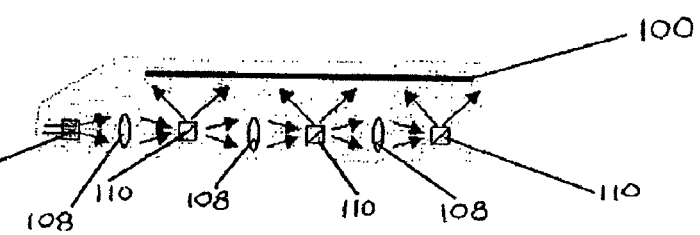
Figure 1D:
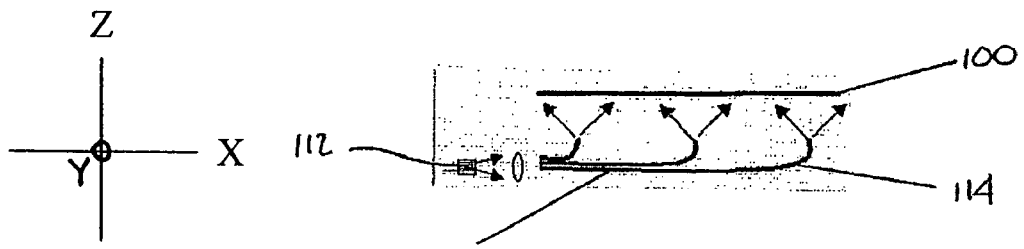
Figure 1E:
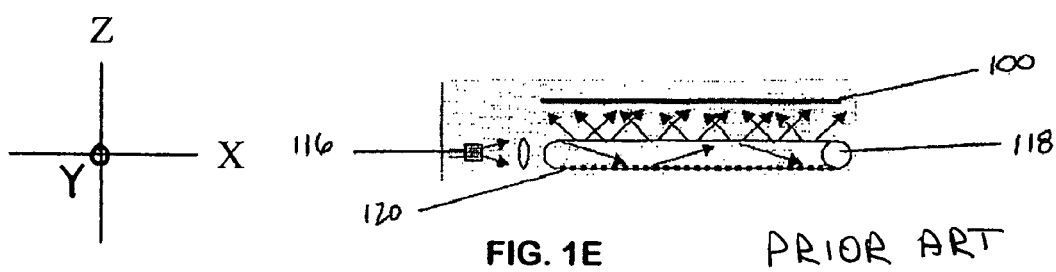
Figure 1F:
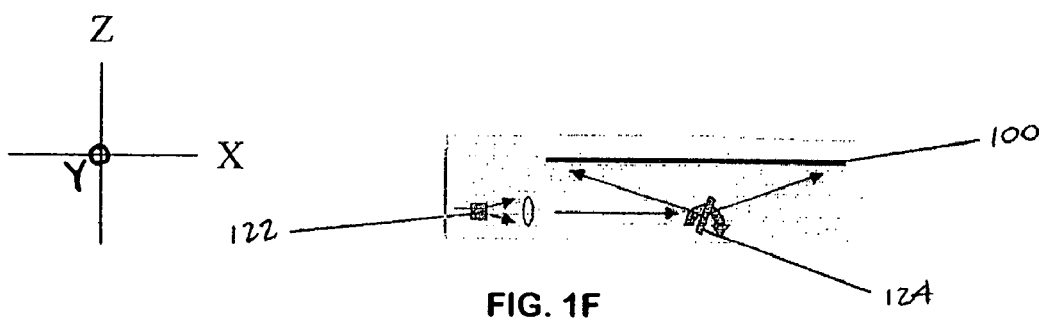
Figure 2A:
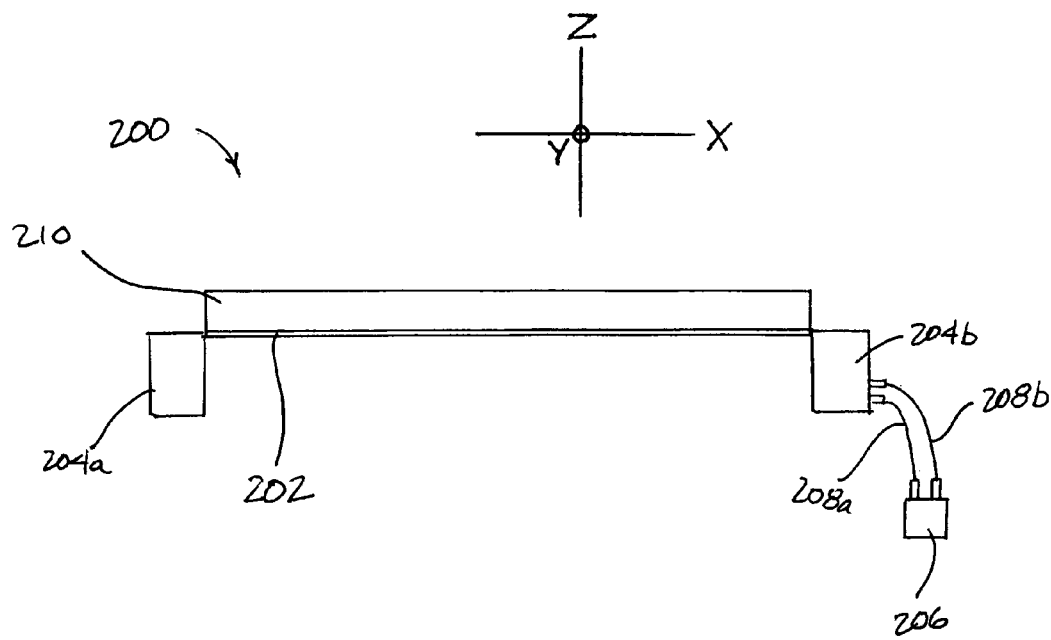
FIG. 2A illustrates a side view of a system for providing a linear light source according to an embodiment of the present invention.
Figure 2B:
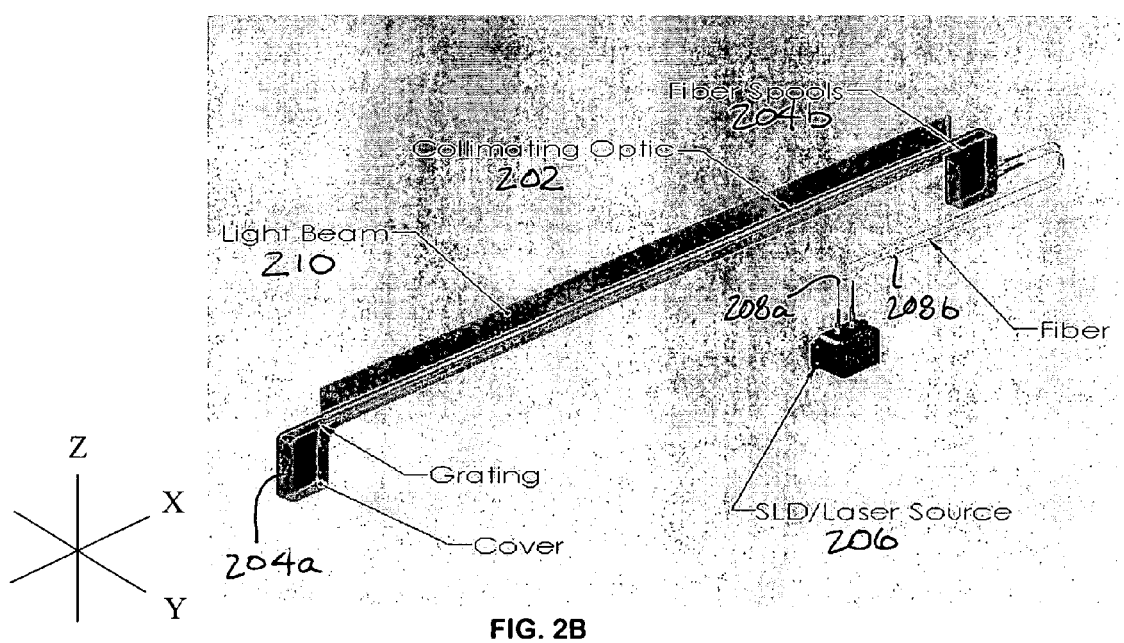
FIG. 2B illustrates a perspective view of the system for providing a linear light source shown in FIG. 3A.

FIGS. 2A-2B illustrate an exemplary linear light field system according to the present invention. As shown, system 200 includes an optical element 202 (a cylindrical convex optical surface) having an optical fiber with a blazed internal grating (e.g., see reference numeral 302 in FIG. 3A) positioned adjacent the optical element 202 and optical fiber spools 204a and 204b (only a single spool of optical fiber may be used in some embodiments). A light source, laser 206, provides (pumps) laser light into the optical element via the optical fibers 208a and 208b, to produce a linear light source field 210.

Embodiments of the present invention may include several types of light sources (i.e., light emitting devices) may be coupled to the optical fiber, including LEDs, SLDs, diode lasers, optical fiber lasers, erbium-doped ASE sources, and laser pumped super continuum sources. These devices may be operated in a continuous mode or in modulated formats.

The cylindrical convex surface may comprise a solid bar-like optical element (e.g., see reference numeral 304 FIGS. 3A-D and reference numeral 404 in FIG. 4), preferably made of glass or plastic and having a transmissivity which corresponds substantially to that of the adjacent optical fiber(s) and may be used to focus, collimate, and/or expand the diffracted beam. The optical fiber(s) may be bonded to the back surface of the optical element (e.g., adhesive), or may be placed adjacent one another using mechanical positioning devices (e.g., frames, guides, and the like). The optical fiber/optical element assembly may be fabricated in a variety of shapes including linear shapes (e.g., lines), circular shapes (e.g., disks, circles) and elliptical shapes (e.g., ellipses), etc. In some embodiments, this may result in the bending of the illuminated rectangle field into a variety of shapes. For example, if the long axis of the rectangular field is bent by deformation perpendicular to the diffracted rays i.e., if one end of the optical fiber/optical element assembly in FIG. 3A was connected to the other end of the optical fiber/optical element assembly in FIG. 3A (in a direction in-out of the page), the rectangle would become a uniformly illuminated annulus. If the long axis of the rectangle is bent by deformation parallel to the diffracted rays, i.e., if the one end of the optical fiber/optical element assembly in FIG. 3A was connected to the other end of the optical fiber/optical element assembly in FIG. 3A (in a direction within the plane of the page), the rectangle would collapse into an illuminated disk.

Figure 3A:
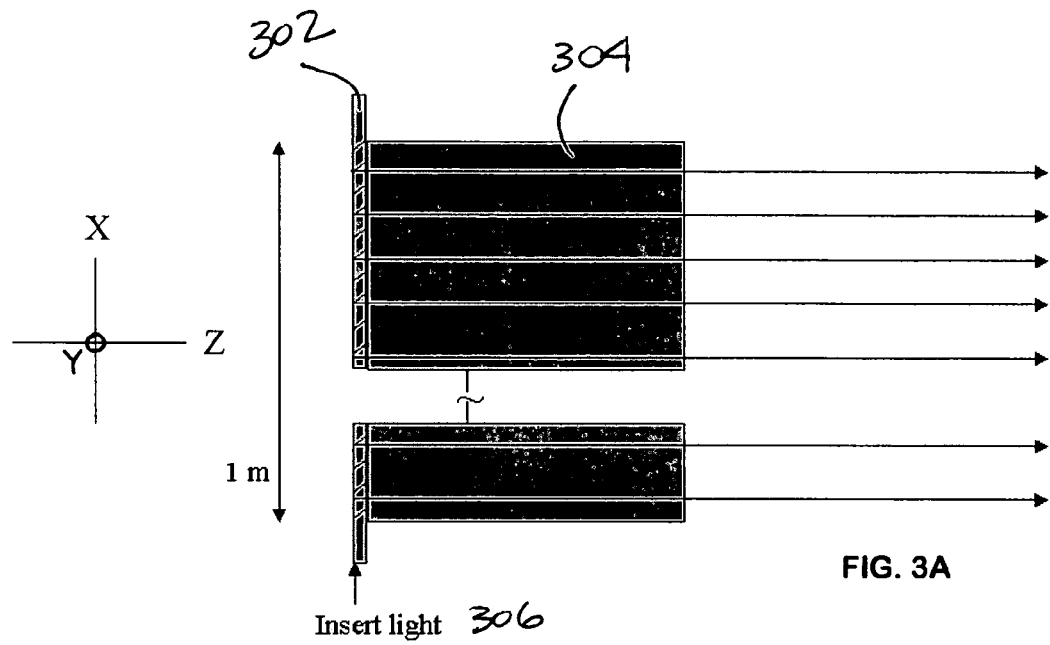
FIG. 3A illustrates a top view of a linear light source device according to an embodiment of the invention.
Figure 3B:
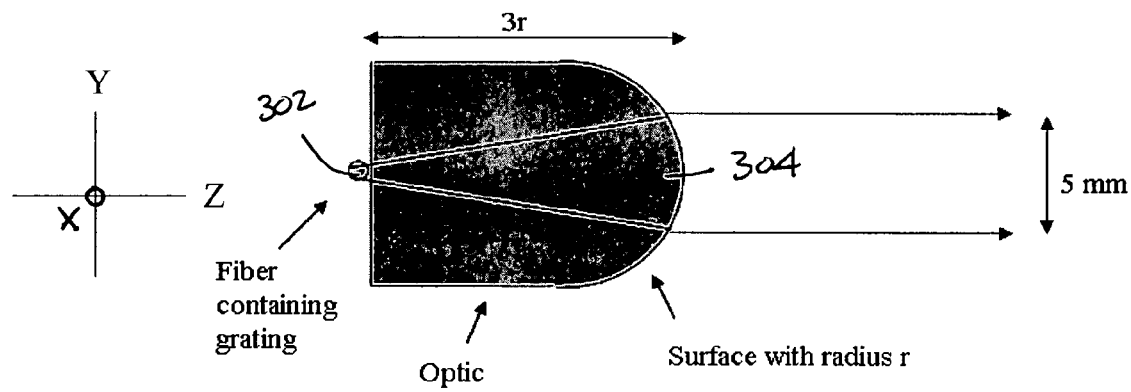
FIG. 3B illustrates a side view of the linear light source device shown in FIG. 4.
Figure 3C:
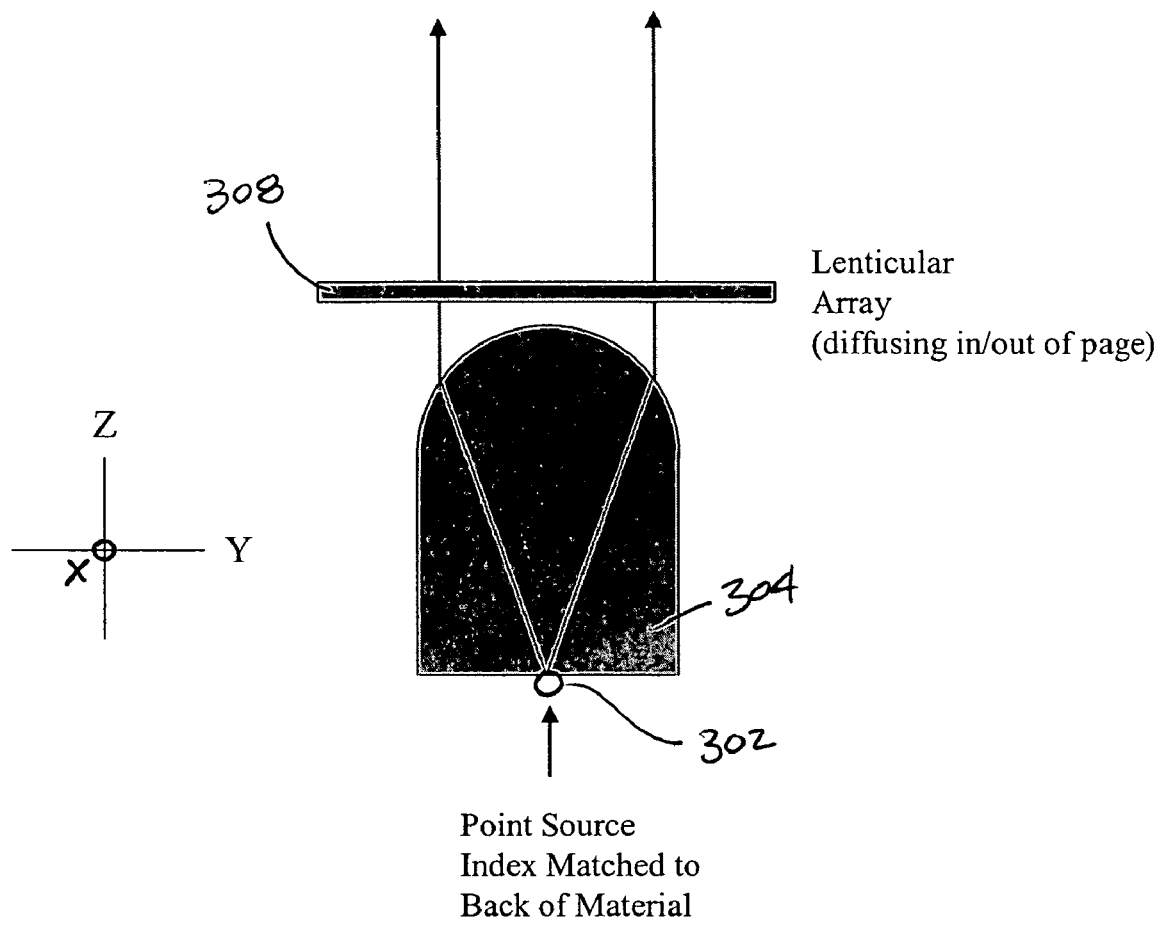
FIG. 3C illustrates a side view of the linear light source device of FIG. 4, including a lenticular array.

FIGS. 3A-3B illustrate the optical element and optical fiber arrangement according to one embodiment of the present invention. As shown, an optical fiber 302 is positioned adjacent an optical element 304 and includes a blazed grating 302a which preferably diffracts incoming light 306 about 90 degrees to the axis of the optical fiber. The length of the optical fiber and optical element may be between several millimeters to one or more meters.

Figure 3D:
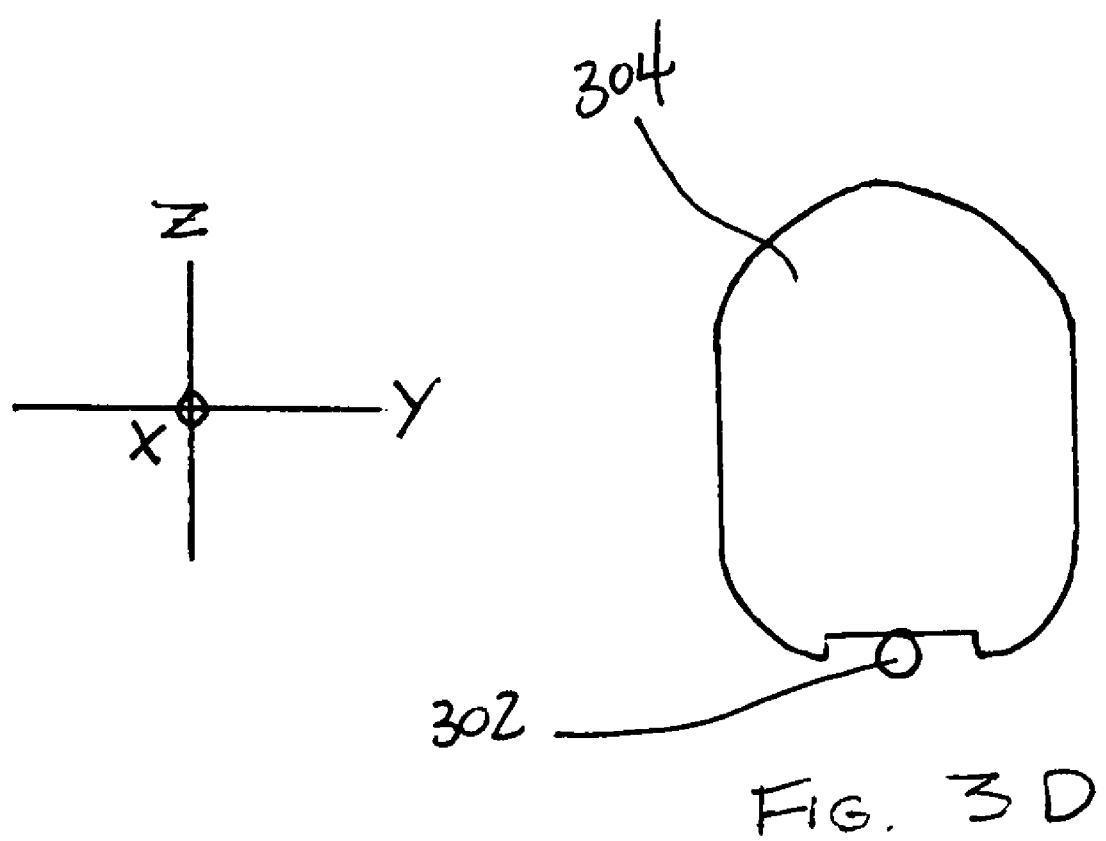
FIG. 3D illustrates a side view of the linear light source device of FIG. 4, including rounded corners.
Figure 4:
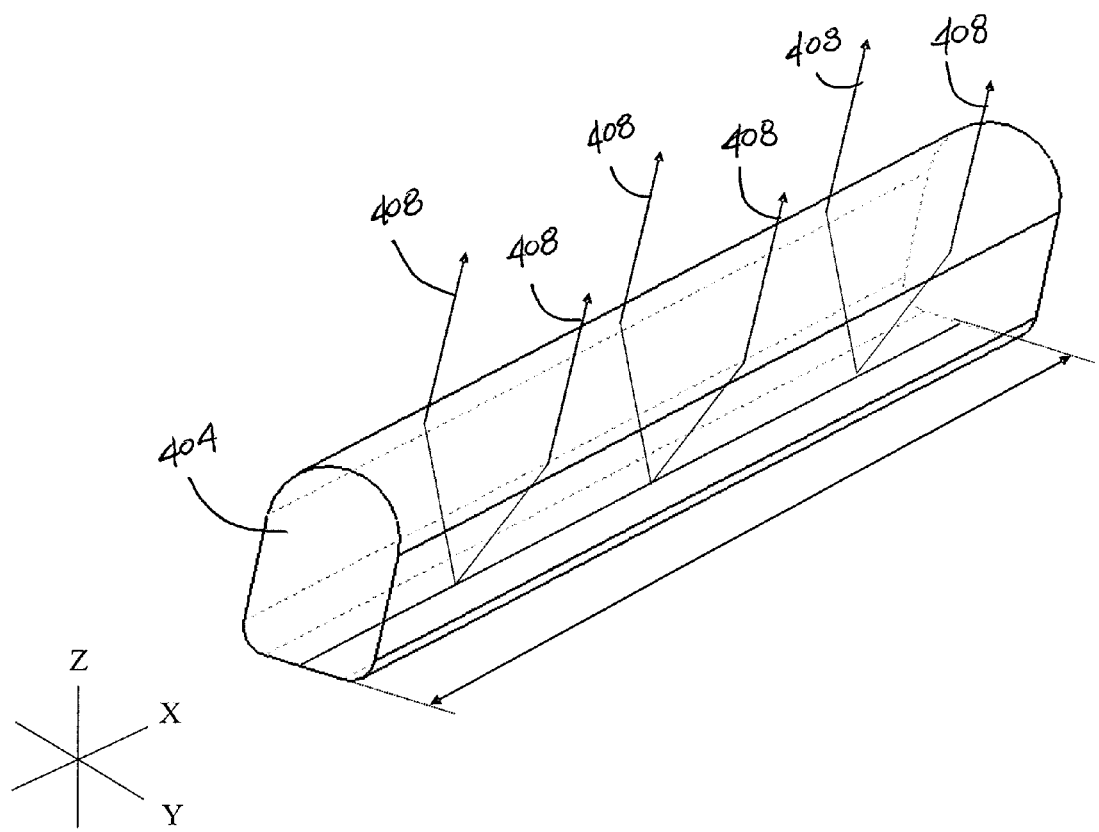
FIG. 4 illustrates a perspective view of a linear light source device according to an embodiment of the present invention.

In one embodiment of the invention, the optical element includes a surface having a radius r, and a height of 3r, as shown in FIG. 3B (see also FIG. 3D, illustrating an optical element having curved corners proximate the optical fiber). In FIG. 3B, the light is diffracted by the grating and refracted by the optical element to produce a field of light having a particular width (e.g., 5 mm). The optical fiber 302 receives light from a point source and includes an index of refraction substantially matched to that of the optical element 304. A lenticular array 308 (FIG. 3C) may be included with the system to remove irregularities from the light field (see, generally, Fresnel Tech in Fort Worth, Tex.; www.fresneltech.com. FIG. 4 illustrates a perspective view of the optical element and optical fiber components of the system illustrating the light ray positions 408 along the length of the optical element 404.

Figure 5:
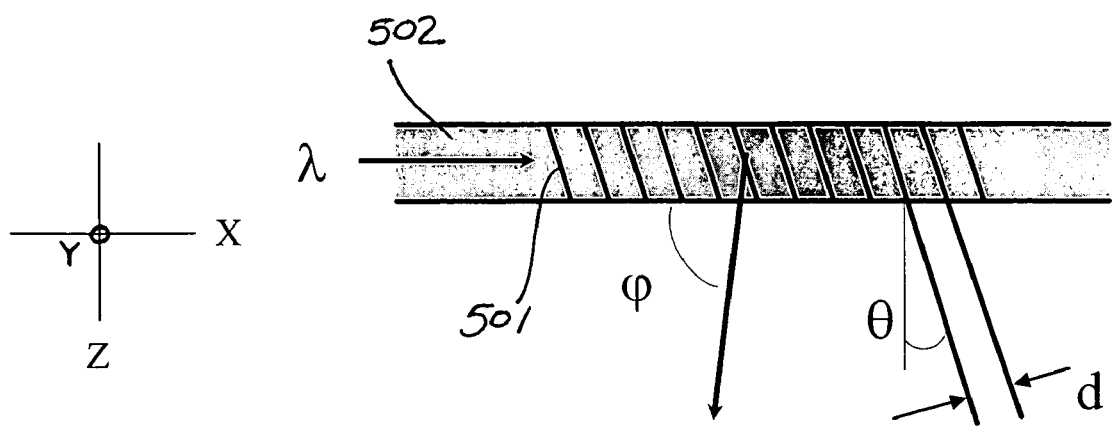
FIG. 5 is schematic diagram of a diffraction grating for an optical fiber according to an embodiment of the present invention.

Blazed gratings within the optical fiber may be created by exposing the core of an optical fiber to ultraviolet light using a UV laser. The UV exposure creates localized changes in the index of refraction of the core glass in the optical fiber, thereby producing the blazed grating. As shown in FIG. 5, the resulting diffraction angle of the grating 501 of optical fiber 502 for one embodiment of the present invention may determined by:

Wavelength $\lambda = (neffd/\cos \theta)*(1+\cos \phi)$, where: d=pitch, θ=external blaze angle, ϕ=diffraction angle and neff=index of core mode. Pitch is the distance between the localized changes in the index of refraction of the core glass.

Figure 6:
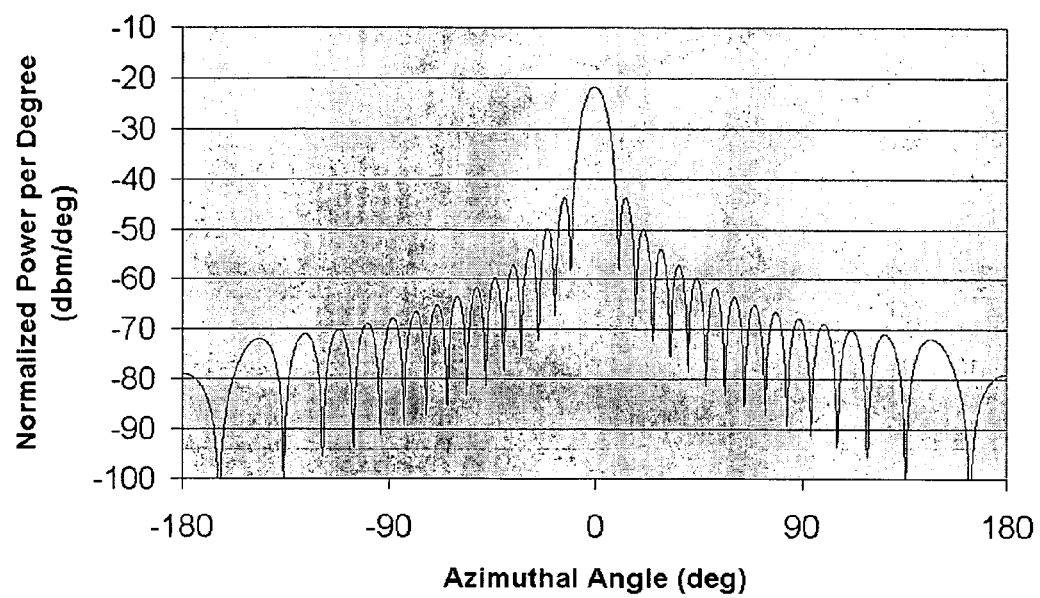
FIG. 6 is a graph illustrating the power versus angle (the angles being orthogonal to the plane of FIG. 5) from grating of a linear light source device according to an embodiment of the present invention.
Figure 7:
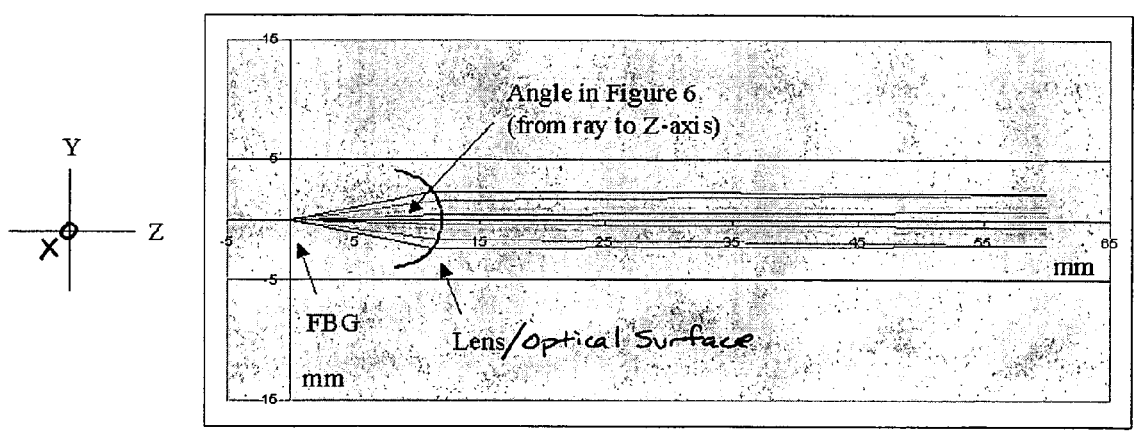
FIG. 7 is a graph illustrating the light-ray positions plotted in mm from the linear light source according to an embodiment of the present invention.
Figure 8:
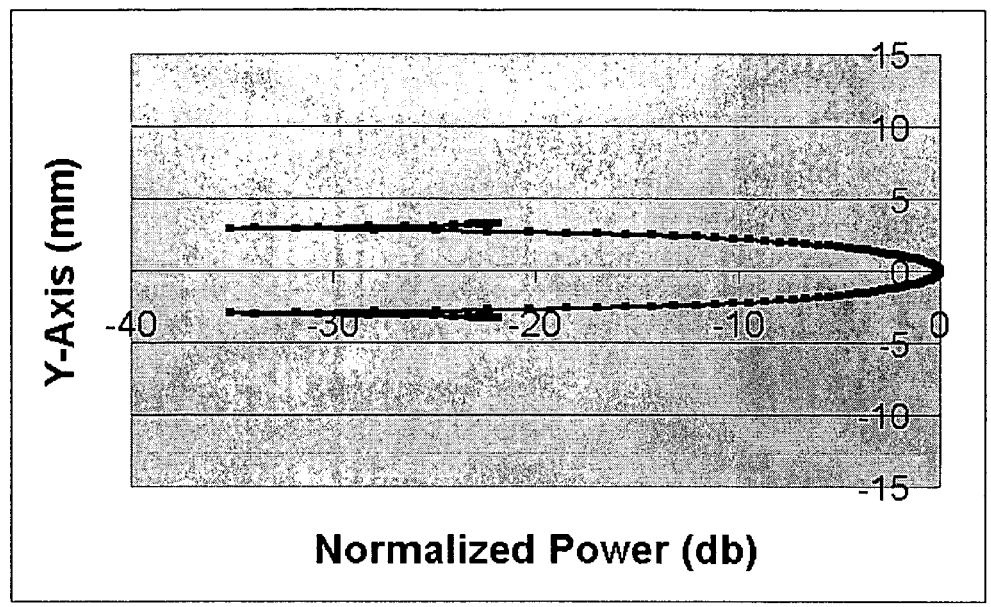
FIG. 8 is a graph illustrating power versus distance after refraction by a curved surface of the linear light source device according to an embodiment of the present invention.

In some of the embodiments of the invention, the grating diffraction angle ϕ is perpendicular to the axis of the optical fiber; i.e., light incident on the gratings is diffracted at about 90 degrees from the optical fiber axis. Briefly:

FIG. 6 illustrates normalized power per degree of angle (azimuthal) that is perpendicular to the diffraction angle; the angles in FIG. 6 represent the angles of the rays relative to the horizontal axis in FIG. 7;

FIG. 8 illustrates light power, relative to FIG. 6, after the light has been collimated by the optical surface as illustrated in FIG. 7; and the diffraction angle is in-out of the page in FIG. 7.

The success of the of some of the embodiments is also evident with reference to FIG. 7, which is a graph illustrating light-ray traces of light refracted by the linear light field system according to some embodiments of the present invention. As shown, the light field established by a particular application of some of the embodiments of the present invention is substantially uniform from the surface of the glass-rod optic out to about several inches (and in some embodiments, beyond), where a width of the light field is approximately about 5 mm. Moreover, as shown in FIG. 8, which illustrates the decrease in light intensity (power) of refracted light versus the distance (width) away from a center of the field of refracted light, the intensity of the refracted light diminishes; in the illustrated example this occurs after about 2-3 mm to either side of the light field, thus, about a 5 mm wide light field (±1 mm) in the illustrated example.

The results of the use of a lenticular array (FIG. 3C), or other lens element, though not required in some embodiments, may be used to correct irregularities in the intensity of the resulting light field as shown in FIGS. 18A-B and FIGS. 19A-B. As shown, when the linear light system is used without a lenticular array, the intensity of the refracted light may include irregularities which are evident in the photograph of the generated light field illustrated in FIG. 18A and graphical representation illustrated in FIG. 18B of light power along the length of the field. In that regard, use of the lenticular array may correct many of such irregularities, as evident from the photograph shown in FIG. 19A and corresponding light power graphical representation FIG. 19B.

As understood by those of skill in the art, grating strength (GS) generally refers to two concepts: an amount of index of refraction change, which often varies along the axis of the optical fiber, and the intensity of the diffracted beam. In some embodiments of the present invention, GS refers to intensity of the refracted light per unit length of the optical fiber for which the grating lies. More specifically, the GS in some embodiments of the present invention comprise the percent of incident light diffracted per unit length (e.g. %/cm) along the optical fiber. Incident light refers to light that encounters each section of the grating. As one of ordinary skill in the art will appreciate, as the light propagates through the gratings, the intensity of the light decreases in subsequent gratings. This concept is generally referred to as depletion. Specifically, as light propagates through these gratings, the intensity is depleted as a function of distance. The depletion follows an exponential law:

$I = I_0 \exp(-kx)$, where I is intensity, k is the loss factor in cm-1 and x is distance along the optical fiber in cm. Thus, the resulting light field produced by the refracted light will typically be non-uniform when using a single optical fiber with a coherent grating (that, in some embodiments, has constant grating strength along the length) provided along the length of the optical fiber.

Figures 12A, 12B:
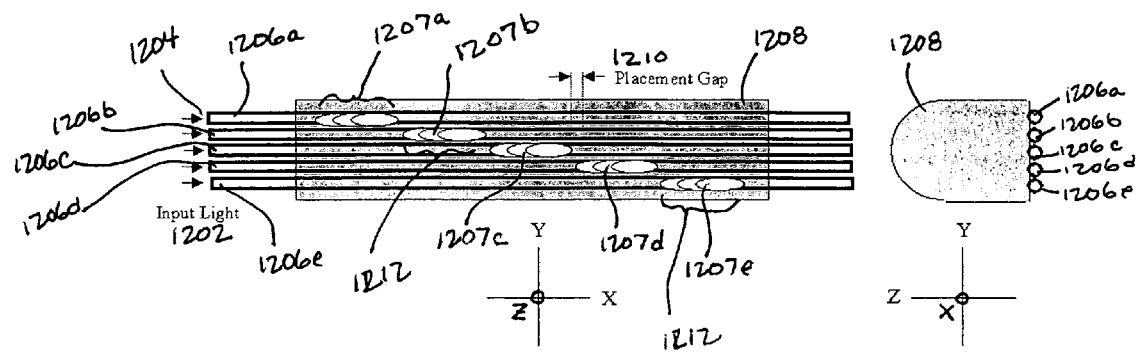
FIG. 12A is a side view of a linear light field system according to an embodiment of the present invention.
FIG. 12B is an end view of a linear light field system according to an embodiment of the present invention.
Figures 13A, 13B:
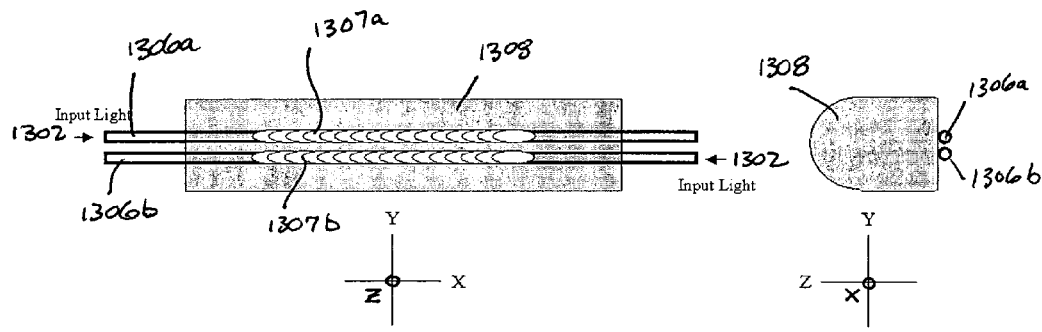
FIG. 13A is a side view of a linear light field system according to an embodiment of the present invention.
FIG. 13B is an end view of a linear light field system according to an embodiment of the present invention.
Figures 14A, 14B:
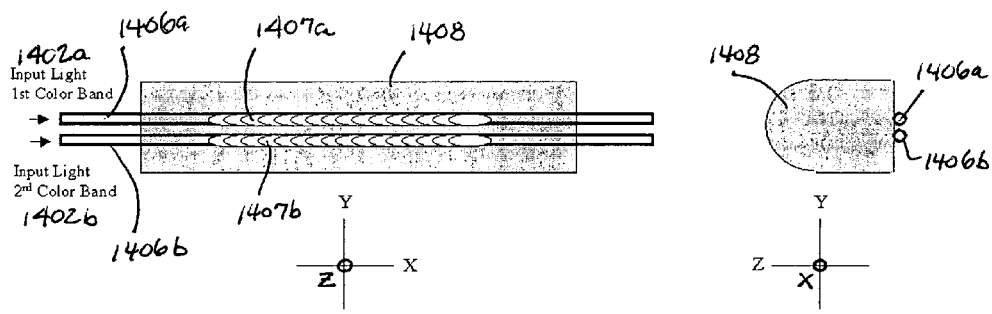
FIG. 14A is a side view of a linear light field system according to an embodiment of the present invention.
FIG. 14B is an end view of a linear light field system according to an embodiment of the present invention.

To address depletion, according to some embodiments, arrangements of optical fibers/gratings may be arranged in at least three manners:

- a coherent grating in one optical fiber (FIG. 10A-B), where the pitch of the grating is constant across the entire length of the optical fiber;
- multiple stitched gratings in one optical fiber (FIG. 11A-B), where each grating preferably has the same pitch, but a stitching gap (which, due to practical limitations, may be different than the pitch) is present between the gratings;
- and single gratings each having the same pitch are provided in multiple optical fibers (FIG. 12A-B).

It is worth noting that the diffracted light in each of FIGS. 10A, 11A, 12A, 13A and 14A points into the page.

As shown in FIG. 10A-B, light 1002 is input at a launching end 1004 of an optical fiber 1006, having blazed grating 1007, which is affixed/positioned proximate an optical element 1008. As indicated, the pitch of the grating is preferably substantially constant.

In FIG. 11A-B, light 1102 is input at a launching end 1104 of an optical fiber 1106 which is affixed/positioned proximate an optical element 1108. Gratings 1107 preferably include the same pitch and are arranged in groups 1112, with each group spaced apart from one another by a stitching distance 1110.

In FIGS. 12A-B, light 1202 is input at a launching end 1204 of each of a plurality of optical fibers 1206a-e, each having a single group 1212 of gratings 1207a-e (respectively) according to a predetermined grating pitch. Each group of gratings is spaced linearly apart from an adjacent group of gratings in an adjacent optical fiber, according to a gap distance 1210. The gap distance may correspond to the stitching distance (and in some embodiments, the gap distance preferably corresponds to the stitching distance). The gaps are typically larger than the pitch, but may be smaller, when (for example) two gratings overlap.

If coherent gratings are used with a single optical fiber, a more uniform illumination may be obtained by "ramping" a grating strength (GS) along the optical fiber. In ramping, the GS in %/cm is designed to be lower at the "launch" end (the end where light is input into the optical fiber) and increases further along the optical fiber. Thus, the resulting light field is more uniform since the initial grating strength is lower at an input end of the optical fiber, allowing more incident light to pass to subsequent gratings, which lets more and more incident light to be diffracted to compensate for depletion. For example, by manufacturing each grating to substantially conform to the following GS, it may be possible to have substantially (near) perfect compensation:

$$GS = So\ \exp(+kx).$$

Figure 9:
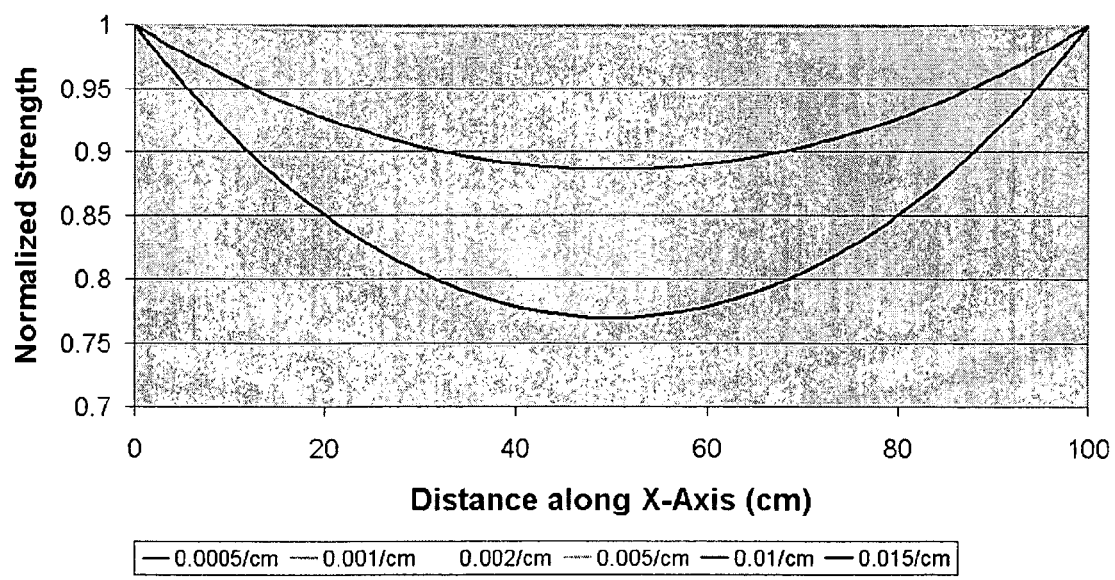
FIG. 9 is a graph illustrating the normalized strength of the light from the linear light source device according to an embodiment of the present invention.

Uniform illumination may also be obtained in other embodiments from non-ramped optical fiber gratings by using (for example) a pair of coherent grating optical fibers (or stitched gratings), each being fed with light from opposite directions (see FIG. 13A-B), resulting in counter-propagating gratings. As shown, light 1302 is input to a first optical fiber 1306a at one end, and input into another optical fiber 1306b at the opposite end. Each optical fiber includes a plurality of individual gratings 1307a-b (respectively) according to a predetermined pitch, and is attached to the optical element 1308. This way, depletion from one grating is compensated by the other grating. While the compensation in the counter-propagating gratings may be imperfect (see FIG. 9), the compensation is generally adequate to provide substantially uniform illumination.

In multiple optical fiber embodiments, the number of optical fibers used is preferably minimized for ease of assembly. Accordingly, in one embodiment, gratings for a diffracting a given color band (e.g., a range or a plurality of wavelengths) are provided in one optical fiber (with, preferably, a ramped GS), and one or more remaining optical fibers, one or more of which including gratings for diffracting other color bands (range or plurality of wavelengths), may be used to make a multi-color line source (see FIG. 14A-B). For example, light of a first color band 1402a is input into optical fiber 1406a and light from a second color band 1402b is input into a second optical fiber 1406b. Each optical fiber includes ramped gratings 1407a-b (respectively) according to a predetermined pitch. Light from the gratings is then refracted by optical element 1408. Thus, while the gratings of one optical fiber may support a limited band of wavelengths (+/−about 100 nm from the center wavelength), multiple optical fibers having corresponding gratings with different color bands may be used with the optical element to support additional wavelengths. In addition, optical switching may also be used to cycle through the various color bands for multi-spectral high speed sorting applications.

Each of these grating/optical fiber embodiments has particular advantages. For example, a long coherent grating generally provides better lighting uniformity, although, in some cases, may be more challenging to manufacture. Multiple, individual optical fibers with a single grating, while easier to manufacture, may be more difficult to assemble together with the optical element and other components of the linear light field system for some embodiments of the invention.

A preferred embodiment of the invention utilizes the single optical fiber/stitched grating design to produce a light field. While some non-uniformity of the refracted light may occur with such an approach, much of the non-uniformity may be corrected by the incorporation of a diffusing element (e.g., a lenticular array).

Coupling the light source to the optical fiber(s) may include associated concerns, and relates generally to coupling efficiency of inputting light into the optical fiber and directionality of the diffracted beam. In some embodiments, a functional compromise is preferred in which use of a low-multimode optical fiber, or a large-effective-area single-mode optical fiber is preferable.

Figure 15:
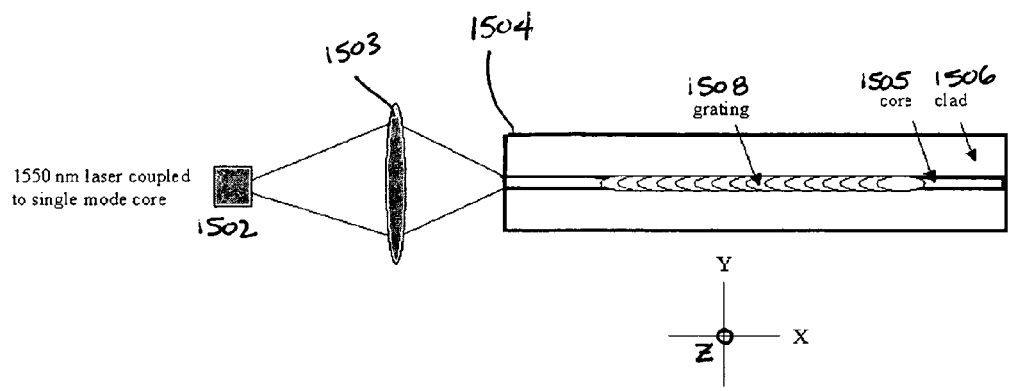
FIG. 15 is a schematic diagram of the coupling of a light source to a linear light field system according to one embodiment of the invention.

Generally, gratings formed in single mode optical fiber are ideal at diffracting light in a particular direction, but are more difficult for coupling light thereto due to the smaller aperture of the single mode optical fiber. Such an example is illustrated in FIG. 15, where a 1550 nm single mode laser 1502 is coupled to the narrow single mode core 1505 of optical fiber 1504, via lens element 1503, having cladding 1506 and grating 1508. This arrangement results in a directionally efficient diffracted 1550 nm beam.

Figure 16A:
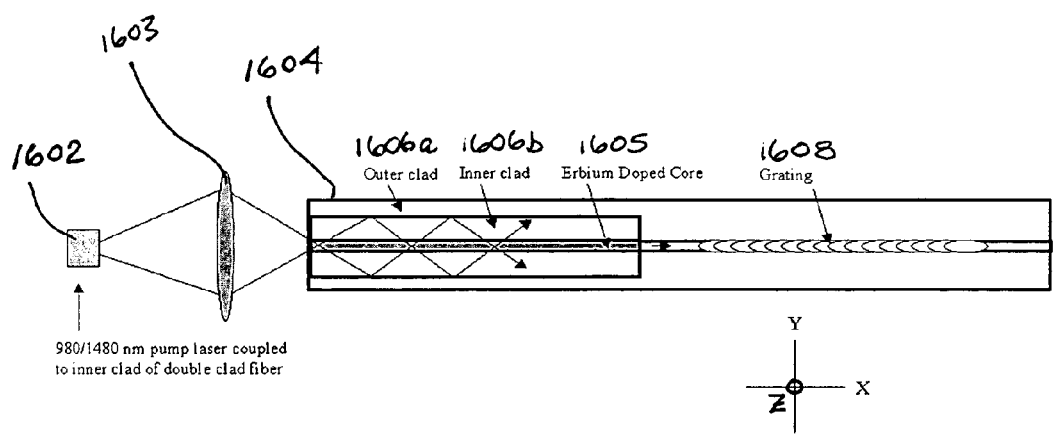
FIG. 16A is a schematic diagram of the coupling of a light source to a linear light field system according to one embodiment of the invention.
Figure 16B:
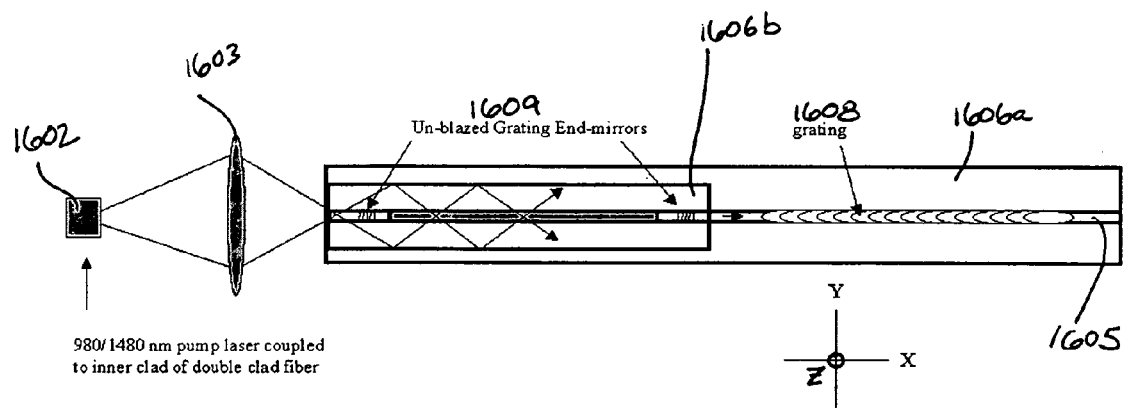
FIG. 16B is a schematic diagram of the coupling of a light source to a linear light field system according to one embodiment of the invention.

The single mode fiber in FIG. 15 may be replaced with a multimode fiber. This may allow for improved coupling of light source 1502 into the fiber core, but may also allow the diffracted beam to become less directional. This may be addressed (in some embodiments) by generating light (that will be diffracted by the grating) inside a single mode core (for example). This may be done by pumping the clad around a single mode core that is doped with erbium. As shown in FIG. 16A, a multimode laser 1602 (e.g., a 980/1480 nm pump) is focused into the inner clad of a double clad fiber. The multimode laser light photoexcites the erbium atoms in the single mode core. The erbium atoms emit ASE radiation that propages in the single mode core (and preferably becomes directionally diffracted by the grating). In FIG. 16B, unblazed gratings may be added on preferably both ends of the erbium doped region such that the ASE radiation becomes lasing radiation, which may then propagate in the single mode core such that diffraction from the grating is preferably directional. In some embodiments, the lasing case of FIG. 16B (a "fiber laser") generates more single mode power than the ASE case of FIG. 16A.

Figure 17:
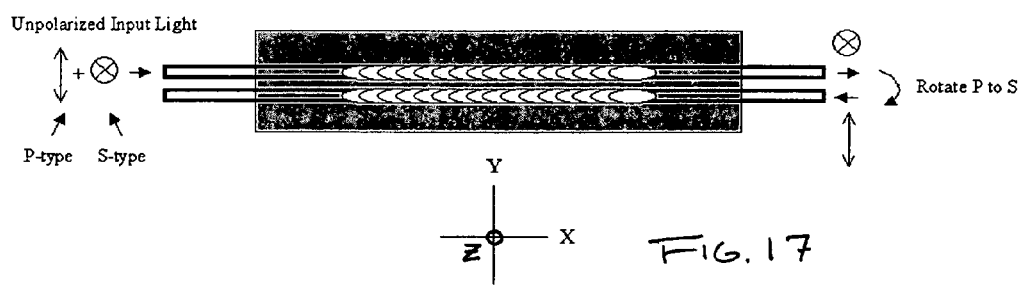
FIG. 17 is a schematic diagram illustrating polarization issues associated with establishing a linear radiant electromagnet energy field
Figure 18A:
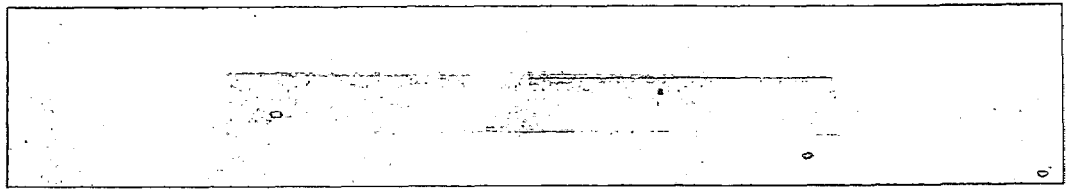
FIG. 18A is a photograph of the light field resulting from an embodiment of the present invention illustrating non-uniformity of the field due to non-uniform gratings and the lack of a lenticular array.
Figure 18B:
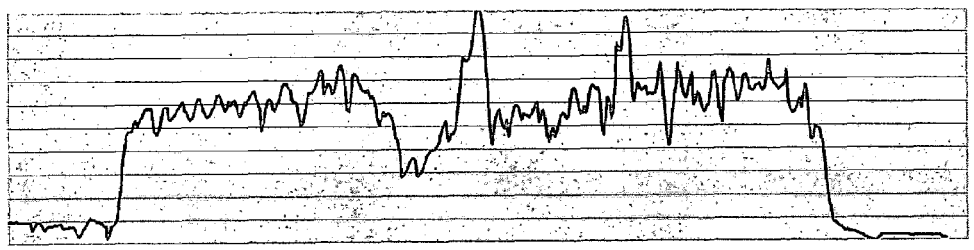
FIG. 18B illustrates a uniformity test for a linear light source device according to an embodiment of the present invention, without the use of a lenticular array.
Figure 19A:
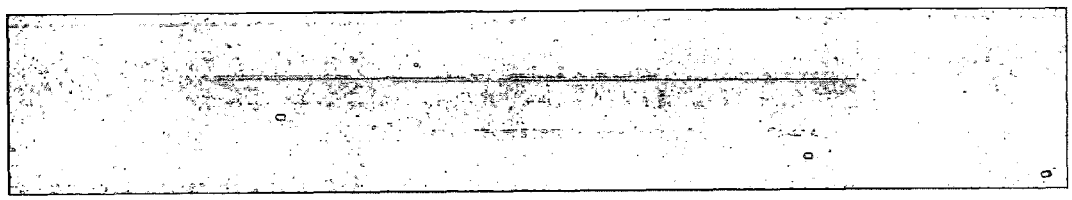
FIG. 19A is a photograph of the light field resulting from an embodiment of the present invention illustrating non-uniformity of the field do to the use of a lenticular array.
Figure 19B:
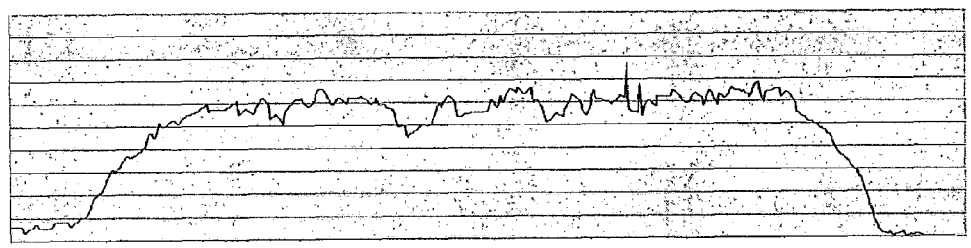
FIG. 19B illustrates a uniformity test for a linear light source device according to an embodiment of the present invention, with the use of a lenticular array.

With regard to polarization, since the blaze gratings according to some embodiments are polarization dependent, the state of polarization (SOP) of the incident radiation preferably are aligned with the grating blaze. Using a randomly polarized, ASE source allows functionality with any splice alignment. Thus, after depleting one linear polarization state during transmission through a first grating, the SOP of the remaining light could be aligned with a counter propagating grating (see FIG. 17).

Each reference (e.g., U.S. patents) noted in the present disclosure is herein incorporated by reference in its entirety.

Having described the invention with reference to the presently preferred embodiments, it is understood that numerous changes in creating and operating such systems and methods may be introduced without departing from the true spirit of the invention.

We claim:

1. A radiant electromagnet energy transmitting apparatus, comprising:
   at least one length of optical fiber including a core having a diffraction grating for diffracting electromagnetic energy in a predetermined direction; and
   an optical surface having a length substantially corresponding to the length of optical fiber and positioned at a predetermined distance from the optical fiber in a direction to receive electromagnetic energy diffracted by the grating of the optical fiber thereby establishing a lighting field.

2. The apparatus according to claim 1, wherein the optical fiber and optical surface can be combined into an assembly comprising a predetermined shape.

3. The apparatus according to claim 1, wherein the resulting lighting field is formed into a predetermined shape.

4. The apparatus according to claim 2, wherein the resulting lighting field is formed into a predetermined shape.

5. The apparatus according to claim 2, wherein the shape is selected from the group consisting of: polygonal, circular, and elliptical.

6. The apparatus according to claim 3, wherein the shape is selected from the group consisting of: polygonal, circular, and elliptical.

7. The apparatus according to claim 4, wherein the shape is selected from the group consisting of: polygonal, circular, and elliptical.

8. The apparatus according to claim 1, wherein the core further comprises at least one un-blazed grating end mirror.

9. The apparatus according to claim 1, wherein the core further comprises at least two un-blazed grating end mirror.

10. The apparatus according to claim 1, wherein the optical fiber is a multimode optical fiber which includes a double cladding.

11. The apparatus according to claim 9, wherein the cladding comprises an inner cladding and an outer cladding.

12. The apparatus according to claim 1, wherein the core is erbium doped.

13. The apparatus according to claim 1, wherein the optical surface comprises a longitudinal body having one longitudinal side comprising a convex surface.

14. The apparatus according to claim 1, wherein the diffraction grating comprises a coherent grating of a predetermined pitch provided along a majority of the length of the optical fiber.

15. The apparatus according to claim 1, wherein the diffraction grating comprises a plurality of stitched gratings, each having a predetermined pitch, wherein each grating is separated by a predetermined stitch distance.

16. The apparatus according to claim 1, wherein the apparatus includes a plurality of optical fibers, each having a single grating, each grating corresponding to a predetermined pitch.

17. The apparatus according to claim 1, wherein a grating strength of the grating is ramped.

18. The apparatus according to claim 1, wherein the apparatus comprises a pair of optical fibers, each having a coherent grating provided in the core of the respective optical fiber, and each grating being ramped in an opposite direction from the other grating.

19. The apparatus according to claim 1, further comprising a source of electromagnetic energy.

20. The apparatus according to claim 19, wherein the source of electromagnetic energy is selected from the group consisting of: a LED, a SLDs, a diode laser, an optical fiber laser, an erbium-doped ASE source, and a laser pumped super continuum source.

21. The apparatus according to claim 19, further comprising a lens for directing electromagnetic energy from the source to the optical fiber.

22. The apparatus according to claim 1, wherein electromagnetic energy is pumped into the core of the optical fiber.

23. The apparatus according to claim 11, wherein electromagnetic energy is pumped into an inner cladding of the optical fiber.

24. The apparatus according to claim 1, wherein the electromagnetic energy is diffracted substantially perpendicular to the axis of the optical fiber.

25. The apparatus according to claim 1, further comprising a lenticular array positioned a predetermined distance from the convex surface.

26. A method for providing a linear field radiant electromagnet energy transmitting apparatus, comprising:
   providing:
      at least one length of optical fiber including a core having a diffraction grating for diffracting electromagnetic energy in a predetermined direction;
      a convex surface having a length corresponding to the length of optical fiber and positioned at a predetermined distance from the optical fiber in a direction to receive electromagnetic energy diffracted by the grating of the optical fiber thereby establishing a linear lighting field; and
      an electromagnetic energy source;
   coupling the electromagnetic energy source to one end of the optical fiber;
   pumping a predetermined wavelength of electromagnetic energy into the optical fiber, whereby the electromagnetic energy is refracted by the gratings of the core at a predetermined angle from the axis of the optical fiber.

27. The method according to claim 26, wherein the predetermined wavelength of electromagnetic energy is pumped into the core of the optical fiber.

28. The method according to claim 27, wherein the predetermined wavelength of electromagnetic energy is pumped into a cladding of the optical fiber.

29. The method according to claim 27, wherein the predetermined wavelength of electromagnetic energy is pumped into an inner cladding of the optical fiber.

30. A linear field radiant electromagnet energy transmitting system comprising:
- a laser;
- at least one length of single mode or multimode optical fiber including a core having a stitched diffraction grating of predetermined pitch for diffracting electromagnetic energy in a predetermined direction;
- a longitudinal optical element having a convex surface and a length corresponding to the length of optical fiber, wherein the optical element is sized such that the convex surface is positioned at a predetermined distance from the optical fiber and in a direction to receive electromagnetic energy diffracted by the grating of the optical fiber thereby establishing a linear lighting field; and
- a lenticular array.

* * * * *